United States Patent
Kuppan et al.

(10) Patent No.: US 11,355,771 B2
(45) Date of Patent: Jun. 7, 2022

(54) ION SCAVENGING AGENT IN FUEL CELL ELECTRODES

(71) Applicant: Robert Bosch GmbH, Stuttgart (DE)

(72) Inventors: Saravanan Kuppan, Sunnyvale, CA (US); Michael Metzger, Sunnyvale, CA (US); Münir M. Besli, San Jose, CA (US); Sondra Hellstrom, East Palo Alto, CA (US); Thilo Lehre, Stuttgart (DE); Jake Christensen, Elk Grove, CA (US)

(73) Assignee: Robert Bosch GmbH, Stuttgart (DE)

( * ) Notice: Subject to any disclaimer, the term of this patent is extended or adjusted under 35 U.S.C. 154(b) by 201 days.

(21) Appl. No.: 16/724,062

(22) Filed: Dec. 20, 2019

(65) Prior Publication Data

US 2021/0194030 A1  Jun. 24, 2021

(51) Int. Cl.
*H01M 8/1023* (2016.01)
*H01M 8/0206* (2016.01)
*H01M 8/1004* (2016.01)
*H01M 8/04119* (2016.01)
*H01M 8/0228* (2016.01)

(52) U.S. Cl.
CPC ....... *H01M 8/1023* (2013.01); *H01M 8/0206* (2013.01); *H01M 8/0228* (2013.01); *H01M 8/04149* (2013.01); *H01M 8/1004* (2013.01)

(58) Field of Classification Search
None
See application file for complete search history.

(56) References Cited

U.S. PATENT DOCUMENTS

| | | | | |
|---|---|---|---|---|
| 2006/0222920 | A1* | 10/2006 | Merzougui | H01M 8/1023 429/410 |
| 2011/0111321 | A1 | 5/2011 | Yang et al. | |
| 2015/0099150 | A1* | 4/2015 | Lee | H01M 10/66 429/101 |
| 2016/0308220 | A1* | 10/2016 | Qi | H01M 4/92 |

OTHER PUBLICATIONS

Lee et al., "Hybrid capacitive deionization to enhance the desalination performance of capacitive techniques", Energy Environ. Sci., 2014, 7, 3683, DOI: 10.1039/c4ee02378a, 7 pages.

Smith et al., "Na-Ion Desalination (NID) Enabled by Na-Blocking Membranes and Symmetric Na-Intercalation: Porous-Electrode Modeling", Journal of The Electrochemical Society, 163 (3) A530-A539 (2016), Illinois, 11 pages.

(Continued)

*Primary Examiner* — Daniel S Gatewood
(74) *Attorney, Agent, or Firm* — Brooks Kushman P.C.

(57) ABSTRACT

A fuel cell including an anode side including an anode, an anode side gas diffusion layer and an anode side bipolar plate formed of a first metal material, and a cathode side including a cathode, a cathode side gas diffusion layer and a cathode side bipolar plate formed of a second metal material. The fuel cell also includes a membrane having first and second sides positioned between the anode and cathode sides. The fuel cell further includes an intercalation host situated in the anode and/or cathode sides. The intercalation host is configured to intercalate metal ions formed from the first and/or second metal materials.

20 Claims, 1 Drawing Sheet

(56) References Cited

OTHER PUBLICATIONS

Kim et al., "Na2FeP2O7 as a Novel Material for Hybrid Capacitive Deionization", Electrochimica Acta 203 (2016) 265-271, Republic of Korea, 7 pages.
Lee et al., "Rocking Chair Desalination Battery Based on Prussian Blue Electrodes", ACS Omega 2017, 2, 1653-1659, DOI: 10.1021/acsomega.6b00526, 7 pages.
Cohen-Tanugi et al., "Water Desalination across Nanoporous Graphene", dx.doi.org/10.1021/nl3012853 | Nano Lett. 2012, 12, 3602-3608, 7 pages.
Cohen-Tanugi et al., "Quantifying the potential of ultra-permeable membranes for water desalination", Energy Environ. Sci., 2014, 7, 1134, DOI: 10.1039/c3ee43221a, 8 pages.
Zhou et al., "Electrically controlled water permeation through graphene oxide membranes", Nature, vol. 559, Jul. 12, 2018, https://doi.org/10.1038/s41586-018-0292-y, 19 pages.
Chen et al., "An improved Hummers method for eco-friendly synthesis of graphene oxide", Carbon 64 (2013) 225-229, http://dx.doi.org/10.1016/j.carbon.2013.07.055, 5 pages.
Pozio et al., "Nation degradation in PEFCs from end plate iron contamination", Electrochimica Acta 48 (2003) 1543/1549, doi:10.1016/S0013-4686(03)00026-4, 7 pages.
Maletzky et al., "Immobilisation of Iron Ions on Nafion® and Its Applicability to the Photo-Fenton Method", Chemosphere, vol. 38, No. 10, pp. 2315-2325, 1999, Aug. 27, 1998, 11 pages.
Li et al., "Durability of PEM fuel cell cathode in the presence of Fe3+ and Al3+", Journal of Power Sources 195 (2010) 8089-8093, doi:10.1016/j.jpowsour.2010.07.003, Canada, 5 pages.
Lim et al., "Fuel Cell Durability Enhancement with Cerium Oxide under Combined Chemical and Mechanical Membrane Degradation", ECS Electrochemistry Letters, 4 (4) F29-F31 (2015)y, Canada, Feb. 20, 2015, 4 pages.
Atrazhev et al., "Direct Mechanism of OH Radicals Formation in PEM Fuel Cells", ECS Transactions, 6 (25) 69-74 (2008)10.1149/1.2943225, © The Electrochemical Society, 7 pages.
Baker et al., "Cerium Migration during PEM Fuel Cell Accelerated Stress Testing", Journal of The Electrochemical Society, 163 (9) F1023-F1031 (2016), Jul. 6, 2016, 10 pages.
Park et al., "Chemical Stability Enhancement of Crown Ether Grafted Sulfonated Poly(arylene ether ketone) Fuel Cell Membrane by Cerium Ion Fixation", Journal of Polymer Science, Part A: Polymer Chemistry 2019, 57, 101-109, DOI: 10.1002/pola.29271, 9 pages.
Hummers et al., "Preparation of Graphitic Oxide", Mar. 20, 1958, 1 page.

\* cited by examiner

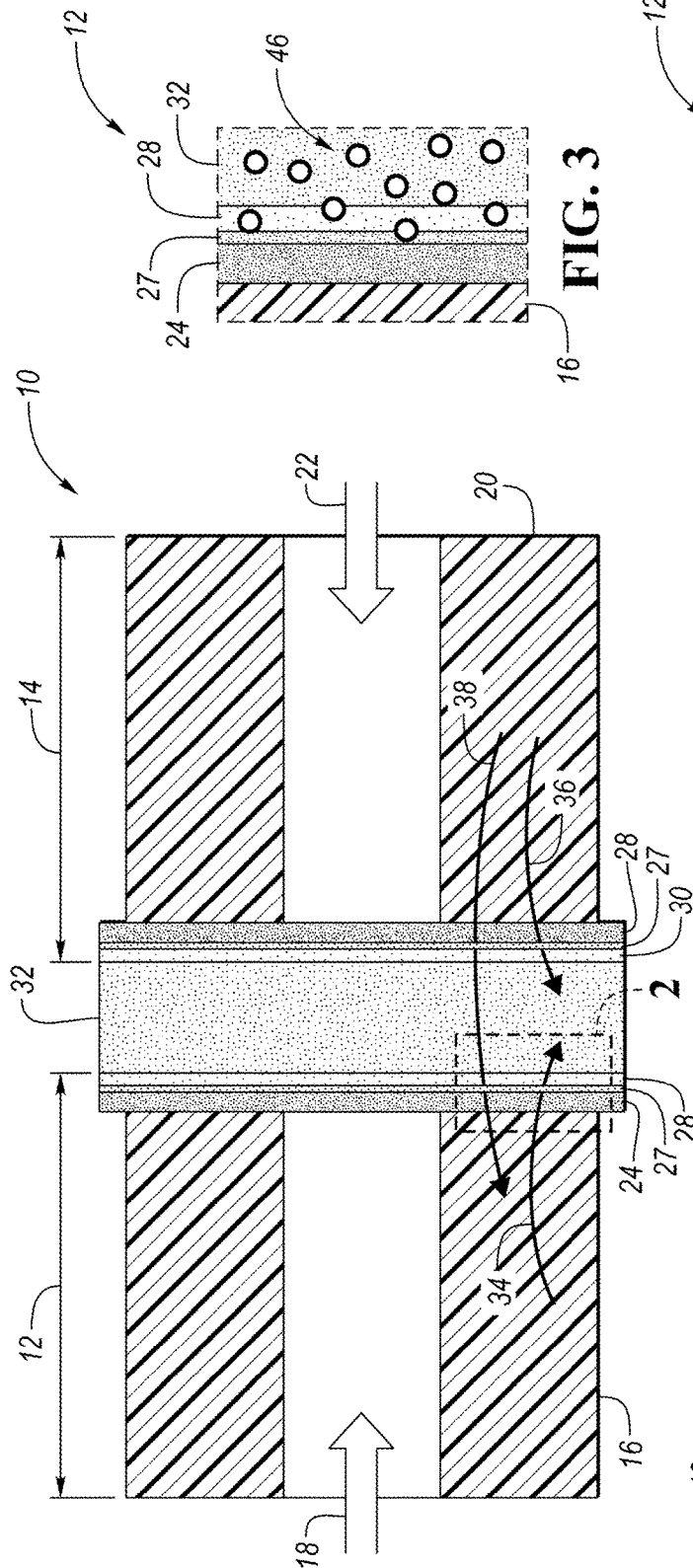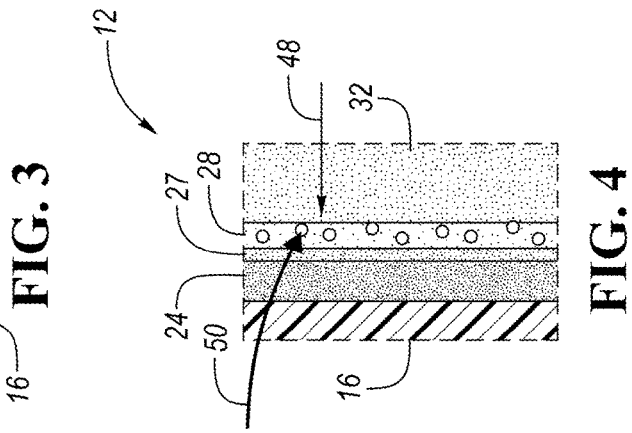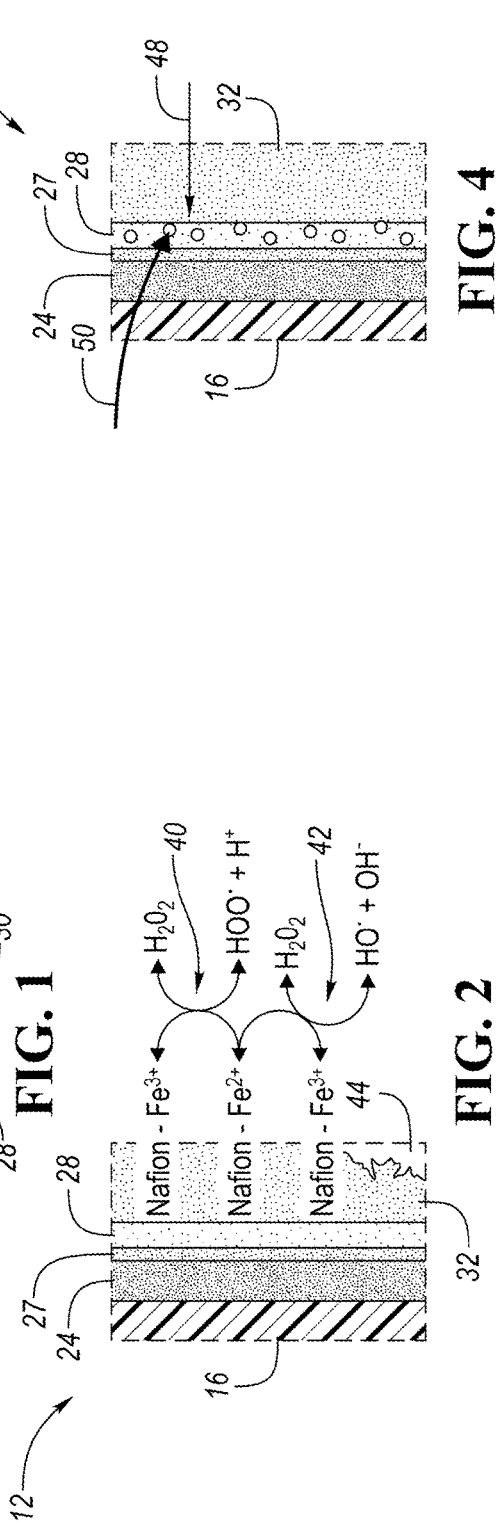

ION SCAVENGING AGENT IN FUEL CELL ELECTRODES

TECHNICAL FIELD

The present disclosure relates to ion scavenging agents in fuel cell electrodes. The ion scavenging agents may be configured to remove ions (e.g. metal ions) generated by corrosion of bipolar plates to mitigate fuel cell membrane and ionomer degradation.

BACKGROUND

Bipolar plates (BPPs) are an important component of fuel cells, including proton-exchange membrane fuel cells (PEMFCs). Bipolar plates are configured to uniformly distribute fuel ($H_2$) and oxidant (air) to the anode and cathode sides, respectively, of a fuel cell stack. A BPP may also be configured to collect current, provide mechanical support to the fuel cell, and facilitate water and heat transport of the fuel cell. BPPs are typically formed of metal materials because of their superior thermal and electrical conductivities, mechanical strength, gas impermeability, fabrication ease and/or relatively low cost compared to graphite or carbon-polymer composite BPPs. The metal materials may be an alloy. The alloy may be an austenitic steel, such as 316 stainless steel (e.g. SS316L or SS316).

SUMMARY

According to one embodiment, a fuel cell is disclosed. The fuel cell includes an anode side including an anode, an anode side gas diffusion layer and an anode side bipolar plate formed of a first metal material. The fuel cell further includes a cathode side including a cathode, a cathode side gas diffusion layer and a cathode side bipolar plate formed of a second metal material. The fuel cell also includes a membrane having first and second sides positioned between the anode and cathode sides. The anode side bipolar plate is positioned adjacent the anode side gas diffusion layer opposite the membrane. The cathode side bipolar plate is positioned adjacent the cathode side gas diffusion layer opposite the membrane. The fuel cell further includes an intercalation host situated in the anode and/or cathode sides. The intercalation host is configured to intercalate metal ions formed from the first and/or second metal materials.

According to one embodiment, a fuel cell is disclosed. The fuel cell includes an anode side including an anode, an anode side gas diffusion layer and an anode side bipolar plate formed of a first metal material. The fuel cell further includes a cathode side including a cathode, a cathode side gas diffusion layer and a cathode side bipolar plate formed of a second metal material. The fuel cell also includes a membrane having first and second sides positioned between the anode and cathode sides. The anode side bipolar plate is positioned adjacent the anode side gas diffusion layer opposite the membrane. The cathode side bipolar plate is positioned adjacent the cathode side gas diffusion layer opposite the membrane. The fuel cell further includes an intercalation host configured to intercalate metal ions formed from the first and/or second metal materials.

According to one embodiment, a fuel cell is disclosed. The fuel cell includes an anode side including an anode, an anode side gas diffusion layer and an anode side bipolar plate formed of a first metal material. The fuel cell further includes a cathode side including a cathode, a cathode side gas diffusion layer and a cathode side bipolar plate formed of a second metal material. The fuel cell also includes a membrane having first and second sides positioned between the anode and cathode sides. The anode side gas diffusion layer is positioned between the anode and the membrane. The cathode side bipolar plate is positioned adjacent the cathode side gas diffusion layer opposite the membrane. The fuel cell further includes a metal ion scavenging agent coated on the anode and/or cathode gas diffusion layers between the anode and/or cathode gas diffusion layers and the anode and/or cathode bipolar plates, respectively, to form a metal ion scavenging layer. The metal ion scavenging agent is configured to scavenge metal ions formed from the first and/or second metal materials.

BRIEF DESCRIPTION OF THE DRAWINGS

FIG. 1 depicts a schematic, side view of a fuel cell.

FIG. 2 depicts a schematic, exploded, side view of a portion of the anode side of the fuel cell shown in FIG. 1.

FIG. 3 depicts a schematic, exploded, side view of a known implementation of $CeO_2$ within a fuel cell.

FIG. 4 depicts a schematic, exploded, side view of an ion scavenging agent incorporated into a fuel cell component (e.g. an anode) according to one embodiment.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Bipolar plates (BPPs) are an important component of fuel cells, including proton-exchange membrane fuel cells (PEMFCs). Bipolar plates are configured to uniformly distribute fuel ($H_2$) and oxidant (air) to the anode and cathode sides, respectively, of a fuel cell stack. A BPP may also be configured to collect current, provide mechanical support to the fuel cell, and facilitate water and heat transport of the fuel cell. BPPs are typically formed of metal materials because of their superior thermal and electrical conductivities, mechanical strength, gas impermeability, fabrication ease and/or relatively low cost compared to graphite or carbon-polymer composite BPPs. The metal materials may be an alloy. The alloy may be an austenitic steel, such as 316 stainless steel (e.g. SS316L or SS316).

While metal BPPs have one or more of the benefits identified above, metal BPPs may have one or more drawbacks. A metal BPP may suffer from poor corrosion resistance during the cyclical oxidic and reductive environment of an PEMFC. Corrosion of a BPP may result in leaching of metal ions from the BPP into a membrane electrode assembly (MEA) comprising a membrane (e.g. polymer electrolyte membrane), anode, cathode and first and second gas diffusion layers (GDLs). The leached metal ions may include chromium (Cr), iron (Fe), nickel (Ni) and/or other metal ions formed from metals present in the BPP alloy.

The anode side BPP may be more prone to leaching than the cathode side BPP, thereby providing a source of leached metal ion contaminants into the membrane and anode catalyst layer. The metal ion contamination may significantly reduce the performance of the fuel cell by increasing the membrane resistance and interfacial resistance between the BPP and the membrane. For instance, Fe ions may promote degradation of the membrane material, such as a Nafion ionomer available from the DuPont Company. The leaching first results in the immobilization of $Fe^{3+}$ ions on sulphonic groups of the membrane material that form poisoned membrane sites. The poisoned membrane sites product hydroxide radicals, which are highly reactive species, in the presence of $H_2O_2$. The most reactive hydroxide radicals can degrade the polymer chains of the membrane material. This degradation may lead to loss of fluoride from the polymer chains, thereby creating pinholes in the membrane.

A known approach for mitigating membrane degradation is deploying $CeO_2$ in membrane and/or catalyst layer. $Ce^{3+}$ ions react with .OH radicals in a catalytic cycle to scavenge the detrimental radicals. This known approach may have one or more drawbacks. $CeO_2$ containing membranes are relatively expensive. Further, these membranes often exhibit a lower proton conductivity and the membranes may lose their radical scavenging ability over time because the $Ce^{3+}$ ions become washed out by humidified gas streams.

In one or more embodiments, a new approach for ion scavenging in PEMFCs to mitigate membrane degradation is disclosed. The new approach may include incorporating a scavenging agent into the catalyst layer on the anode side. The scavenging agent may be one or more cation intercalation host material and/or one or more chelating ligands. The scavenging agent may be configured to remove ions generated by corrosion of BPPs to mitigate fuel cell membrane and ionomer degradation. The BPPs may be formed of the same or different metal materials.

FIG. 1 depicts a schematic, side view of fuel cell 10. Fuel cell 10 can be stacked to create a fuel cell stack. Fuel cell 10 includes anode side 12 and cathode side 14. Anode side 12 includes bipolar plate (BPP) 16 configured to distribute Hz, as shown by arrow 18, to anode side 12. Cathode side 14 includes BPP 20 configured to distribute air, as shown by arrow 22, to cathode side 14. Anode side 12 also includes gas diffusion layer (GDL) 24 and anode 26. Cathode side 14 includes GDL 28 and cathode 30. Membrane 32 is situated between anode side 12 and cathode side 14.

A hydrogen oxidation reaction (HOR) occurs at anode side 12 of fuel cell 10. The HOR oxidizes $H_2$ to generate electrons ($e^-$) and protons ($H^+$), as depicted by the following reaction equation:

$$H_2 \rightarrow 2H^+ + 2e^- \qquad (1)$$

An oxygen reduction reaction (ORR) occurs at cathode side 14 of fuel cell 10. The ORR reduces oxygen from the air distributed by BPP 20 and reacts with $H^+$ produced by the HOR to form water, as depicted by the following reaction equation:

$$\tfrac{1}{2}O_2 + 2H^+ + 2e^- \rightarrow H_2O \qquad (2)$$

In an acidic environment, which may occur at anode side 12, BPP 16 may undergo a corrosion reaction and release metal ions, such as $Fe^{3+}$ ions. According to the $Fe^{3+}$ ion example, $Fe^{3+}$ ions may bind to the membrane material, such as a Nafion ionomer, in fuel cell membrane 32 and act as a catalytic site for generation of .OH radicals from $H_2O_2$, which is a byproduct of the ORR at cathode 30. .OH radicals may lead to cleavage of Nafion polymer chains and thus cause membrane degradation, e.g. pinholes.

FIG. 2 depicts a schematic, exploded side view of a portion of anode side 12 of fuel cell 10 shown in FIG. 1. FIGS. 1 and 2 depict a mechanism of radical generation and membrane degradation. Metal ions may be released from BPP 16 when exposed to acidic medial. For example, $Fe^{3+}$ ions may be released from BPP 16 through the following reaction equation:

$$Fe \rightarrow Fe^{3+} + 3e^- \qquad (3)$$

As shown by arrow 34, metal ions are released from BPP 16 and are transported with a reaction media (e.g. humidified $H_2$) through GDL 24 to anode 26 and membrane 32. The ORR generates water, which migrates through fuel cell 10, as shown by arrows 36 and 38. This water may humidity the $H_2$ from anode side 12. The metal ions may bind to the membrane material in membrane 32 and anode 26. As shown in FIG. 2, $Fe^{3+}$ ions bind to a Nafion ionomer and catalyze the formation of .OH radicals from hydrogen peroxide (ORR byproduct) according to a Fenton like reaction, as shown below and depicted by reference numeral 40.

$$\text{Nafion-}Fe^{3+}+H_2O_2 \rightarrow \text{Nafion-}Fe^{2+}+HO_2.+H^+ \quad (4)$$

A continuous supply of metal ions may be provided by oxidation of the metal ions in the presence of $H_2O_2$. As shown in FIG. 2, a continuous supply of $Fe^{3+}$ is provided by the oxidation of $Fe^{2+}$ to $Fe^{3+}$ in presence of $H_2O_2$, as shown by the reaction equation below and depicted by reference numeral 42, or through continuous oxidation of stainless steel.

$$\text{Nafion-}Fe^{2+}+H_2O_2 \rightarrow \text{Nafion-}Fe^{3+}+HO.+OH^- \quad (5)$$

The .OH radicals produced cleave ionomer polymer chains (e.g. Nafion ionomer chains), thereby degrading the ionomer and membrane 32 as shown by degradation 44 in FIG. 2.

A known approach for mitigating membrane degradation is to deploy $CeO_2$ in membrane and/or catalyst layer. $Ce^{3+}$ ions react with .OH radicals in a catalytic cycle to scavenge the detrimental radicals. FIG. 3 is a schematic, exploded side view of the implementation of this known approach within fuel cell 10. $CeO_2$ particles 46 may be incorporated into anode 26 at an anode concentration and/or membrane 32 at a membrane concentration. The membrane concentration may be any of the following values or in a range of any two of the following values: $10^{-4}$, $10^{-3}$, $10^{-2}$, 1 and 10 weight %. According to this known approach, .OH radicals are scavenged according to the following reaction mechanism:

$$Ce^{4+}+HOO.+H_2 \rightarrow Ce^{3+}+H_2O_2+H^+ \quad (6)$$

$$Ce^{3+}+HO.+H^+ \rightarrow Ce^{4+}+H_2O \quad (7)$$

In one or more embodiments, a new approach for ion scavenging in PEMFCs to mitigate membrane degradation is disclosed. The new approach may include incorporating an ion scavenging agent into the anode side of the fuel cell. The metal ion scavenging material may be one or more cation intercalation host material and/or one or more chelating ligands. The ion scavenging agent may be configured to remove and/or sequester ions generated by corrosion of BPPs to mitigate fuel cell membrane and ionomer degradation.

As shown in FIG. 4, ion scavenging agent 48 may be incorporated into anode 26. Ion scavenging agent 48 may be a cation intercalation host (IH) configured to intercalate $Fe^{3+}$ ions as shown by arrow 50 and represented by the reaction equation below, thereby mitigating .OH radical formation and membrane degradation.

$$IH+Fe^{3+}+3e^- \rightarrow IH\text{-}Fe \quad (8)$$

The intercalation host material is configured to undergo the reversible inclusion or insertion of a metal ion into the intercalation host material having a number of layers where insertion takes place between adjacent layers. The insertion may not include the chemical binding of the metal ion to the intercalation host material, but rather the physical insertion of the metal ion within adjacent layers.

The intercalation host material may be, but is not limited to, the following materials: $TiS_2$, $ZrS_2$, $TiSe_2$, $MoS_2$, $VOPO_4.H_2O$, $MnPS_3$, $H_2Ti_4O_9$, $H_4Nb_6O_{17}$, $MoO_3$, and graphite. The cation intercalation host material may also be a layered double hydroxide having the general sequence $[AcB\ Z\ AcB]_n$, where c represents layers of metal cations, A and B are layers of hydroxide anions, and Z are layers of other anions and neutral molecules, represented by the formula $[M_{1-x}^{2+}N_x^{3+}(OH^-)_2]^{x+}[(X^{n-})_{x/n}.yH_2O]^{x-}$ where $X^{n-}$ is one or more intercalating ions, $M^{2+}$ may be a metal cation (e.g. $Ca^{2+}$, $Mg^{2+}$, $Mn^{2+}$, $Fe^{2+}$, $Co^{2+}$, $Ni^{2+}$, $Cu^{2+}$ or $Zn^{2+}$) and $N^{3+}$ may be a trivalent cation (e.g., of the same metal of M). The value of x may be any of the following values or in a range of any two of the following values: 0.2, 0.25, 0.3, 0.35, 0.4, 0.45 and 0.5.

The intercalation host may also be Prussian blue (ferric hexacyanoferrate (HCF)) or a Prussian blue analog (e.g. a hexacyanomanganate (HCM)-based compounds). Non-limiting examples of HCM-based compounds include NiHCF, NiCuHCF, and MnHCM. The intercalation host material may also be a polymer material, such as polyaniline (PANT), 3-hexylthiophene, polypyrrole. The intercalation host material may be any single material identified above or any combination thereof.

Ion scavenging agent 48 may be one or more chelating agents configured to bind to metal ions released by BPPs 16 and/or 20, thereby mitigating the formation of .OH radical and membrane degradation. Non-limiting examples of chelating agents in accordance with one or more embodiments include crown esters (e.g. 1,4,7,10-tetraoxacyclododecane, 1,4,7,10,13-Pentaoxacyclopentadecane, 1,4,7,10, 13,16-hexaoxacyclooctadecane), acids (e.g. gluconic acid ($C_6H_{12}O_7$), porphyrin, protoporphyrin derivatives, ethylenediamine-N,N'-bis(2-hydroxyphenylacetic) acid (o,o-EDDHA) and its analogues, tetraethylenetetraamine, trientine, and aminopolycarboxylic acids (e.g. ethylenediamine-tetraacetic acid (EDTA), nitrilotriacetic acid ($C_6H_9NO_6$) (NTA), trimethylediminetetraacetic acid, 1,2-dimethylethylenediamine tetraacetic acid, H4L (DMEDTA), ethylenebis(oxyethylenenitrilo)tetraacetic acid (EGTA), and oxybis(ethylenenitrilo)tetraacetic acid (EEDTA)).

FIG. 4 depicts ion scavenging agent 48 dispersed within anode 26. In other embodiments, ion scavenging agent 48 may be dispersed differently within fuel cell 10 (e.g. anode side 12). The dispersion methods of one or more embodiments may be combined.

In one or more embodiments, the ion scavenging agent may be incorporated as an interface layer between a BPP and GDL (e.g. at the interface between GDL 24 and BPP 16 on anode side 12 and/or the interface between GDL 28 and BPP 20 on cathode side 12). In one embodiment, the interface layer may be discrete such that no ion scavenging agent is included in the GDL or the BPP. The incorporation may be a coating on the GDL at the interface between a BPP and GDL. The coating may cover the entire surface area of the GDL and/or the BPP. Alternatively, the coating may cover a percentage of each of or both surfaces of the GDL and/or the BPP. The percentage coverage may be any of the following values or in a range of any two of the following values: 0.1, 1, 10, 15, 20, 25, 30, 35, 40, 45, 50, 55, 60, 65, 70, 75, 80, 85, 90, 95 and 100 percent. The mean thickness of the coating may be any of the following values or in a range of any two of the following values: 0.1, 1, 10, 15, 20, 25, 30, 35, 40, 45, 50, 55, 60, 65, 70, 75, 80, 85, 90, 95 and 100 µm. The coating may be formed purely of the ion scavenging agent or may be mixed with other materials, such as a conductive carbon (e.g. Vulcan, Ketjenblack or a combination thereof) and a binder (e.g. PTFE, PVDF or a combination thereof).

In one or more embodiments, the ion scavenging material may be incorporated into a GDL (e.g. GDL 24). The ion scavenging material may be well dispersed within the GDL such that the distance between each individual particle is less than the thickness of the GDL for the scavenging process to be effective. The loading amount of the ion scavenging material may be any of the following values or in a range of any two of the following values: 0.01, 0.05, 0.1, 10, 50 and 100 mg/cm$^2$.

In one or more embodiments, fuel cell 10 includes a microporous layer (MPL) situated between a GDL and an electrode. For instance, MPL may be situated between GDL 28 and cathode 30. As another example, MPL may be situated between GDL 24 and anode 26. In one or more embodiments, the ion scavenging agent may be incorporated into one or more MPLs. The ion scavenging agent may be well dispersed within the MPL such that the distance between each individual particle is less than the thickness of the MPL for the scavenging process to be effective. The loading amount of the ion scavenging agent may be any of the following values or in a range of any two of the following values: 0.01, 0.05, 0.1, 10, 50 and 100 mg/cm$^2$.

In one or more embodiments, the ion scavenging agent may be incorporated into an electrode layer (e.g. anode 26 or cathode 28). The ion scavenging agent may be well dispersed within the electrode layer such that the distance between each individual particle is less than the thickness of the electrode layer for the scavenging process to be effective. The loading amount of the ion scavenging agent may be any of the following values or in a range of any two of the following values: 0.01, 0.05, 0.1, 10, 50 and 100 mg/cm$^2$.

In addition to an active material within each electrode, one or both electrode layers may include one or more conductivity agents, one or more polymeric binders, and/or one or more other components. One or both electrode layers may include an active material in any of the following amounts or in a range of any two of the following amounts: 60, 70, 75, 95, 97 and 99 weight %, based on the total weight of the electrode layer. One or both electrode layers may include one or more conductivity agents collectively in any of the following amounts or in a range of any two of the following amounts: 1, 2.5, 5, 20, 30 and 40 weight %, based on the total weight of the electrode layer. One or both electrodes may include one or more polymeric binders collectively in any of the following amounts or in a range of any two of the following amounts: 1, 2.5, 5, 15, 20 and 30 weight %, based on the total weight of the electrode layer.

Non-limiting examples of a conductivity agent include carbon black, conductive carbon black, amorphous carbon, carbon fibers, quaternary ammonium salts, alkyl sulfonates, halogen-free cationic compounds and/or combinations thereof.

Non-limiting examples of a polymeric binder include polyvinylidene fluoride (PVdF), polyacrylonitrile (PAN), poly(methyl methacrylate) (PMMA), polyethylene glycol (PEO), polyimide, polydopamine, poly(ethylene glycol) diacrylate, polymethylpentene, nylon, metal-aramid, polyether imide, copolyester, polyetherketone, carboxymethyl cellulose, styrene-butadiene rubber (SBR), copolymers and blends such as poly(vinylidenefluoride-hexafluoropropylene) (PVdF-HFP), poly(vinylidenefluoride-chlrotrifluoroethylene) (PVdF-CTFE), poly(methyl methacrylate-vinyl acetate) (PMMA-VAc), poly(ethylene glycol) diacrylate (PEGDA), poly(methyl methacrylate-acrylonitrile-vinyl acetate) (PMMA-AN-VAc), poly(methyl methacrylate-co-butyl acrylate) (PMMA-co-BA), poly(3,4-ethylenedioxythiophene) polystyrene sulfonate-co-polyethylene glycol (PEDOT-co-PEG) and/or combinations thereof.

An electrode containing an intercalation host may be configured to operate within a water stability window. The water stability window may be any of the following values or in a range of any two of the following values: −0.5, −0.4, −0.3, 0, 0.9, 1.1, 1.2 and 1.5 V in comparison to a standard hydrogen electrode (SHE) (or, 2.2 to 3.6 V vs. Na/Na$^+$), for neutral water at a pH of about 7-8. A lower pH value may shift the voltage higher (up to +0.4 V at pH of 0) and a higher pH value may shift the voltage lower (up to −0.4 V at pH of 14).

The electrode layer area may be any of the following values or in a range of any two of the following values: 10, 50, 100, 250, 350 and 500 cm$^2$. The electrode layer thickness may be any of the following values or in a range of any two of the following values: 2.5, 5, 10, 300, 400 and 500 µm, depending on the choice of electrode materials, porosity, tortuosity, viscosity of slurry containing the electrode materials, and/or the actual composition ratio of active material(s):binder:carbon. The porosity of the electrode layer may be any of the following values or in a range of any two of the following values: 20, 30, 40, 60, 70 and 80%. The electrode density of the electrode layer may be any of the following values or in a range of any two of the following values: 0.1, 0.25, 0.5, 3, 4 and 5 g/cm$^3$, depending on the particle size, microstructure, hardness of materials, as well as the amount of additive carbon in the electrode system.

In one or more embodiments, the ion scavenging agent may be incorporated at as an interface layer between a GDL and an electrode layer (e.g. at the interface between GDL 24 and anode 26 and/or the interface between GDL 28 and cathode 30). In one embodiment, the interface layer may be discrete such that no ion scavenging agent is included in the GDL or the electrode layer. The incorporation may be a coating on the GDL at the interface between the GDL and the electrode. The coating may cover the entire surface area of the GDL and/or the electrode. Alternatively, the coating may cover a percentage of each of or both surfaces of the GDL and/or the electrode. The percentage coverage may be any of the following values or in a range of any two of the following values: 0.1, 1, 10, 15, 20, 25, 30, 35, 40, 45, 50, 55, 60, 65, 70, 75, 80, 85, 90, 95 and 100 percent. The mean thickness of the coating may be any of the following values or in a range of any two of the following values: 0.1, 1, 10, 15, 20, 25, 30, 35, 40, 45, 50, 55, 60, 65, 70, 75, 80, 85, 90, 95 and 100 µm. The coating may be formed purely of the metal ion scavenging material or may be mixed with other materials, such as a conductive carbon (e.g. Vulcan, Ketjenblack or a combination thereof) and a binder (e.g. PTFE, PVDF or a combination thereof).

The actual storage capacity of an intercalation host may vary depending on the operating voltage conditions, concentration of ions present, overall chemistry composition, acidity, and ohmic or any other type of resistance with the fuel cell. The actual storage capacity may be any of the following values or in a range of any two of the following values: 1, 10, 25, 50, 100, 150, 200, 250 and 300 mAh/g.

The cation intercalation hosts may intercalate ions when their potential is lower than the redox potential of the active redox couple in the cation intercalation host material. In one embodiment, the potential of an anode catalyst layer (~0 V vs. SHE) is sufficiently low to drive the cation intercalation reaction. Alternatively, the ion intercalation reaction may be driven by a controller algorithm that controls the active voltage, e.g. bringing electrode potential to a respective voltage versus a counter or reference electrode. The ion scavenging of one or more embodiments may be done at one or both electrodes. In one embodiment, since a cathode is typically at voltages above the intercalation potential (~0.6-0.8 V), ion intercalation on the cathode side is conducted with a controller algorithm that controls the active voltage.

The ion scavenging process may be conducted during normal fuel cell operation or as a periodic ion cleaning step.

The periodic ion cleaning step may be applied after a given number of operating hours or specific events, e.g. shutdown and/or start-up cycles. In one or more embodiments, if the intercalation hosts become saturated with ions, a "purging step" or "regeneration step" may be done where the respective electrode containing fully or partially saturated intercalation hosts is held at high voltage, e.g., 0.6 V or higher versus SHE to drive de-intercalation. The intercalation and de-intercalation operations may be performed pursuant to a controller configured to determine when a certain fuel cell operating condition is met.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A fuel cell comprising:
   an anode side including an anode, an anode side gas diffusion layer and an anode side bipolar plate formed of a first metal material;
   a cathode side including a cathode, a cathode side gas diffusion layer and a cathode side bipolar plate formed of a second metal material;
   a membrane having first and second sides positioned between the anode and cathode sides, the anode side bipolar plate positioned adjacent the anode side gas diffusion layer opposite the membrane, the cathode side bipolar plate positioned adjacent the cathode side gas diffusion layer opposite the membrane; and
   an intercalation host situated in the anode and/or cathode sides and configured to intercalate metal ions formed from the first and/or second metal materials, the intercalation host includes a layered double hydroxide.

2. The fuel cell of claim 1, wherein the anode and/or cathode including one or more active materials, one or more conductivity agents, one or more polymeric binders, and/or one or more other components.

3. The fuel cell of claim 1, wherein the intercalation host is incorporated into the anode and/or cathode.

4. The fuel cell of claim 3, wherein a loading of the intercalation host incorporated into the anode and/or cathode is in a range of 0.01 to 100 mg/cm$^2$.

5. The fuel cell of claim 3, wherein the intercalation host is configured to operate within a water stability window in a range of −0.5 to 1.5 V in comparison to a standard hydrogen electrode.

6. The fuel cell of claim 1, wherein the intercalation host includes Prussian blue or an analog thereof.

7. A fuel cell comprising:
   an anode side including an anode, an anode side gas diffusion layer and an anode side bipolar plate formed of a first metal material;
   a cathode side including a cathode, a cathode side gas diffusion layer and a cathode side bipolar plate formed of a second metal material;
   a membrane having first and second sides positioned between the anode and cathode sides, the anode side bipolar plate positioned adjacent the anode side gas diffusion layer opposite the membrane, the cathode side bipolar plate positioned adjacent the cathode side gas diffusion layer opposite the membrane; and
   an intercalation host configured to intercalate metal ions formed from the first and/or second metal materials, the intercalation host includes a layered double hydroxide.

8. The fuel cell of claim 7, wherein the anode and/or cathode includes one or more active materials, one or more conductivity agents, one or more polymeric binders, and/or one or more other components.

9. The fuel cell of claim 7, wherein the intercalation host is configured to operate within a water stability window in a range of −0.5 to 1.5 V in comparison to a standard hydrogen electrode.

10. The fuel cell of claim 7, further comprising an anode side microporous layer situated between the anode side gas diffusion layer and the anode and a cathode side microporous layer situated between the cathode side gas diffusion layer and the cathode.

11. The fuel cell of claim 7, wherein the loading of the intercalation host is in a range of 0.01 to 100 mg/cm$^2$.

12. The fuel cell of claim 7, wherein the intercalation host includes Prussian blue or an analog thereof.

13. A fuel cell comprising:
   an anode side including an anode, an anode side gas diffusion layer and an anode side bipolar plate formed of a first metal material;
   a cathode side including a cathode, a cathode side gas diffusion layer and a cathode side bipolar plate formed of a second metal material;
   a membrane having first and second sides positioned between the anode and cathode sides, the anode side bipolar plate positioned adjacent the anode side gas diffusion layer opposite the membrane, the cathode side bipolar plate positioned adjacent the cathode side gas diffusion layer opposite the membrane; and a metal ion scavenging agent configured to scavenge metal ions formed from the first and/or second metal materials, the metal ion scavenging agent including a chelating agent, the chelating agent including a porphyrin or a protoporphyrin derivative.

14. The fuel cell of claim 13, wherein the metal ion scavenging agent covers the entire surface area of the anode and/or cathode gas diffusion layers and the anode and/or cathode bipolar plates, respectively.

15. The fuel cell of claim 13, wherein the chelating agent i-includes an aminopolycarboxylic acid.

16. The fuel cell of claim 15, wherein the aminopolycarboxylic acid is selected from the group consisting of: ethylenediamine-tetraacetic acid (EDTA), nitrilotriacetic acid ($C_6H_9NO_6$) (NTA), trimethylenediminetetraacetic acid, 1,2-dimethylethylenediamine tetraacetic acid, H4L (DMEDTA), ethylenebis(oxyethylenenitrilo)tetraacetic acid (EGTA), and oxybis(ethylenenitrilo)tetraacetic acid (EEDTA) and combinations thereof.

17. The fuel cell of claim 13, wherein the metal ion scavenging agent is coated on the anode and/or cathode gas diffusion layers to form a metal ion scavenging layer.

18. The fuel cell of claim 13, wherein the metal ion scavenging layer is situated between the anode and/or cathode gas diffusion layers and the anode and/or cathode bipolar plates, respectively.

19. The fuel cell of claim 13, wherein the anode and/or cathode including one or more active materials, one or more conductivity agents, one or more polymeric binders, and/or one or more other components.

20. The fuel cell of claim 13, wherein a loading of the metal ion scavenging agent is in a range of 0.01 to 100 mg/cm$^2$.

* * * * *

UNITED STATES PATENT AND TRADEMARK OFFICE
CERTIFICATE OF CORRECTION

PATENT NO. : 11,355,771 B2
APPLICATION NO. : 16/724062
DATED : June 7, 2022
INVENTOR(S) : Saravanan Kuppan et al.

It is certified that error appears in the above-identified patent and that said Letters Patent is hereby corrected as shown below:

In the Claims

Column 11, Lines 12-13, Claim 15:
After "wherein the chelating agent"
Delete "i-includes"
Insert --includes--.

Signed and Sealed this
Eleventh Day of July, 2023

Katherine Kelly Vidal
*Director of the United States Patent and Trademark Office*